(12) United States Patent
Marissen

(10) Patent No.: US 7,993,716 B2
(45) Date of Patent: Aug. 9, 2011

(54) PROCESS FOR THE MANUFACTURE OF CURVED OBJECTS

(75) Inventor: Roeloef Marissen, Born (NL)

(73) Assignee: DSM IP Assets B.V., Heerlen (NL)

( * ) Notice: Subject to any disclaimer, the term of this patent is extended or adjusted under 35 U.S.C. 154(b) by 1133 days.

(21) Appl. No.: 10/584,860

(22) PCT Filed: Jan. 7, 2005

(86) PCT No.: PCT/NL2005/000004
§ 371 (c)(1),
(2), (4) Date: Sep. 8, 2006

(87) PCT Pub. No.: WO2005/065910
PCT Pub. Date: Jul. 21, 2005

(65) Prior Publication Data
US 2009/0155511 A1    Jun. 18, 2009

(30) Foreign Application Priority Data

Jan. 7, 2004 (NL) .................................. 1025176
Sep. 17, 2004 (NL) .................................. 1027068

(51) Int. Cl.
*B32B 27/12* (2006.01)
*B32B 27/04* (2006.01)

(52) U.S. Cl. .................... 428/36.3; 428/174; 428/292.1; 428/911; 442/60; 442/203

(58) Field of Classification Search .................. 442/135; 2/2.2; 428/911, 113; 264/510
See application file for complete search history.

(56) References Cited

U.S. PATENT DOCUMENTS

| 5,135,804 | A | 8/1992 | Harpell et al. |
| 5,387,382 | A | 2/1995 | Fottinger et al. |
| 6,277,773 | B1 | 8/2001 | Ward et al. |
| 6,482,343 | B1 | 11/2002 | Cohen et al. |
| 6,846,758 | B2 * | 1/2005 | Bhatnagar et al. ............ 442/135 |

FOREIGN PATENT DOCUMENTS

| EP | 0 116 845 | 8/1984 |
| EP | 0 472 237 A | 2/1992 |
| GB | 1 386 953 | 3/1975 |
| GB | 2 253 420 | 9/1992 |

* cited by examiner

*Primary Examiner* — Rena L Dye
*Assistant Examiner* — Ellen S Wood
(74) *Attorney, Agent, or Firm* — Nixon & Vanderhye P.C.

(57) ABSTRACT

The invention relates to a process for the manufacture of an object, curved in one or more directions, from a package of at least one stacked ply containing polymeric fibers by the deforming thereof at elevated temperature, the process comprising imposing on the fibres a tensile stress at a temperature lying between the melting point of the fibers at the imposed tensile stress and 20° C. below the melting point, which tensile stress is high enough for the fibers to be drawn. This process allows objects, curved in one or more directions, to be produced from flat fiber plies without appreciable wrinkling using even fiber plies with low internal and/or mutual deformability and without material being drawn into the die in a controlled manner. The invention also relates to an object, curved in one or more directions, obtainable by the process according to the invention.

20 Claims, No Drawings

PROCESS FOR THE MANUFACTURE OF CURVED OBJECTS

This application is the US national phase of international application PCT/NL2005/000004 filed 7 Jan. 2005 which designated the U.S. and claims benefit of NL 1025176 and NL 1027068, dated 7 Jan. 2004 and 17 Sep. 2004, respectively, the entire content of each of which is hereby incorporated by reference.

The invention relates to a process for the manufacture of an object, curved in one or more directions, from a package of at least one stacked ply containing polymeric fibres by the deforming thereof at elevated temperature. The invention also relates to an object, curved in one or more directions, obtainable with the process according to the invention.

Such a process is known from the publication "The Smart Blankholder as a Development Tool for the Rubber Forming Process of Continuous Fiber Reinforced Thermoplastics" by C. A. J. R. Vermeeren et al. in the Proceedings of the ICCM held at San Diego, Calif., on 14-18 Jul. 2003.

That publication addresses the problem of wrinkling in the manufacture of objects, curved in one or more directions, such as helmets, from stacked flat plies containing polymeric fibres, hereafter briefly referred to as fibre plies. As a solution it suggests clamping the border of the fibre plies in a controlled manner onto the top side of the hollow part of the die used so that material is drawn into the die in the appropriate locations and in suitable amounts as the die is closed. As the deformation mechanisms from flat plies to a curved object it mentions, besides allowing extra material to be drawn into the die in localized areas in a controlled manner, the shear or slip that occurs between and within the various plies. In addition, in the case of fibre plies such as fabrics or knittings, the elongation due to their construction obviously plays a part, too.

Controlled adjustment of the blankholder, i.e. the clamping mechanism, is a complex and time-consuming issue. Moreover, according to the article, the possible amount of the aforementioned shearing and slip is limited and wrinkling will at some point occur in the material drawn into the die anyway.

From NL 8802114A it is known to employ a blankholder having a circular recess. That publication, too, states that deformability of the fibre plies is a critical requirement and the blankholder is designed so that a greater force is exerted on the fibre plies in the directions in which deformability is greatest. Accordingly, in this process the fibre direction is preferably essentially the same in all plies. This implies that here, too, material is drawn into the die in a controlled manner and that use is made of the shear and slip occurring in the package of fibre plies.

In NL 9000079A a blankholder comparable to the one in the preceding document is applied and is mounted on the die to clamp in a controlled manner. Here, too, the deformability of the package of fibre plies is utilized in the forming process.

Thus, the processes of both patents described have the same aforementioned drawback.

The invention aims to provide a process that does not have that drawback or has it to a lesser extent.

This object is achieved according to the invention in that the process comprises imposing a tensile stress on the fibres, at a temperature lying between the melting point of the fibres at the imposed tensile stress and 20° C. below said melting point, which tensile stress is high enough for the fibres to be drawn.

This process allows objects, curved in one or more directions, to be produced from flat fibre plies without appreciable wrinkling using even fibre plies with low internal and/or mutual deformability and without material being drawn into the die in a controlled manner.

By utilizing the drawability of the fibres in the fibre plies rather than being fully reliant on the deformability of the fibre plies and controlled material addition, the required shape change at the flat-to-curved transition in the object is made possible by the required change in length in each location being brought about by the drawing of the fibres present therein.

A further advantage of the process according to the invention is that the fibres in the plies in the package may be oriented in more than one, even in any and all, directions, whereby a wrinkle-free object with more homogenous properties is obtained.

In the above cited article by Vermeeren et al. the deformation behaviour is predicted using a computer program named Drape. This program is entirely based on the effect of deformation mechanisms such as shear, slip and optionally low elastic strain or elongation due to construction.

In the thesis by E. A. D. Lamers, Technical University of Twente (NL) dated April 2004 and entitled "Shape distortions in fabric reinforced composite products due to processing induced fibre orientation" use is also made of a deformation model based on shear, with fibre strain being assumed to be negligible.

Thus, the insight that the drawability of the fibres can be utilized as the deformation mechanism for a package of fibre plies is altogether absent in the subject field of the art.

The process is directed at the manufacture of objects, curved in one or more directions. Examples hereof include radomes, helmets, ballistic protection panels for shoulders or other means of protection for, for instance, soldiers and armour panels for automobiles or for military helicopters.

The object is formed from a package of at least one ply containing polymeric fibres. Suitable polymeric fibres are prepared from a polymeric material whose macromolecules exhibit a certain degree of chain slip at a temperature below the melting point, i.e. in the solid phase, under the influence of an imposed stress. Examples hereof include various polyolefins, such as for example polyethylene, polypropylene, and copolymers thereof, optionally with other monomers, polyvinyl alcohol, and polyamides and polyesters, especially polyamides and polyester that contain at least one aliphatic monomeric unit. Preferably, a polyolefin fibre, in particular a polyethylene fibre is applied. A polyethylene fibre is preferably made from a linear polyethylene, i.e. a polyethylene with less than 1 side chain, containing at least 10 carbon atoms per 100 C atoms, more preferably less than 1 side chain per 300 C atoms.

Various forms of fibre can be employed in the process according to the invention. "Fibre" includes a body whose length is far greater than the transverse dimensions, and comprises a monofilament, a multifilament yarn, a strip, ribbon or tape and the like. Suitable fibres include multifilament yarns, the thickness and number of filaments not being critical. Suitable yarns have a titer of for example 100 to 4000 dtex. The thickness per filament which the yarns are made up of may vary from for example 0.2 to 20 dpf. It is also possible to use a yarn spun from short filaments or staple fibres. Preferably, however, multifilament yarns are used.

Preferably so-called high-performance yarns are used; these are fibres with superior mechanical properties, in particular with a tensile strength of at least 2 GPa and a tensile modulus of at least 50 GPa. More preferably, the tensile strength is at least 2.5 and even 3 GPa and the modulus at least 70 and even 90 GPa. The tensile properties of fibres are determined by a method as specified in ASTM D885M. The use of fibres with such a high modulus and tensile strength allows objects to be manufactured with very good mechanical properties and ballistic properties and high resistance to extraneous forces, such as helmets.

Unsuitable or less suitable for use in the process according to the invention were found to be high-performance fibres based on polymers that exhibit lyotropic or thermotropic liquid crystalline behaviour, such as aromatic polyamides (aramides), polybenzimidazoles or polybenzoaxozoles. This type of fibres has the desired high mechanical rigidity and strength, and is thus suitable for use in objects such as helmets, but exhibits no or hardly any irreversible strain at a temperature below the melting point. For similar reasons high-performance glass fibres and carbon fibres prove unsuitable for use in the present process.

Surprisingly, it has been found that some fibres also having superior mechanical properties do qualify for use in the process according to the invention; especially fibres based on ultra-high molecular polyethylene.

Such strong fibres are preferably prepared from ultra-high molecular weight polyethylene (UHPE). UHPE is understood to be a preferably linear polyethylene with an intrinsic viscosity (IV, as determined on solutions in decalin at 135° C.) of at least 4 dl/g, preferably at least 8 dl/g. The preparation and properties of these fibres are described in numerous publications including GB 204214 A and WO 01/73171 A1 and such fibres are commercially available, for instance with the trade name Dyneema® of DSM (NL), Spectra® of Honeywell (US).

The plies containing fibres, also fibre plies, preferably contain continuous fibres. This means that at least 90% of the fibres extend throughout the ply, and begin and end or reverse on the outer border of the ply. Suitable plies may take the shape of fabrics but may also be so-called non-wovens such as unidirectional plies in which the fibres in the ply are arranged in parallel, or mats in which the fibres have a random direction. The warp and weft of fibres may consist of the same or similar fibres, but a high-performance fibre may also be applied in either direction and a fibre with less-than-superior mechanical properties in the other direction. The fabric may be balanced, which means that about as many fibres are present in both directions, but may also be unbalanced or have a uniweave structure, which is a fabric of a unidirectional nature. Suitable examples hereof are described in for example EP 1144740 B1. The fibres may be present as monofilaments but also as twisted or untwisted yarn bundles.

Preferably, a package of a number of stacked fibre plies is started from. When unidirectional plies are used, the fibre directions in each ply are preferably at an angle, for example about 90°, to those in the adjacent ply or plies. In a special embodiment the fibre directions are uniformly distributed in the package. This affords in the forming process a more isotropic distribution of the forces exerted and thus an object that is more homogeneous in its properties.

The fibre ply may consist of fibres only, but the ply may also consist of fibres and up to 50% by mass of a binder, for example a suitable polymer, as a matrix in which the fibres are embedded. The term "binder" here refers to a material that fully or partially envelops the fibres and keeps the fibres together during and after processing. The binder may be a matrix material but may also be an adhesive strip positioned at an angle to the fibre direction. A binder may be applied from one of various forms, for example as a film but also as a polymer melt, a suspension or solution; only in certain areas or homogeneously distributed over the fibres. A combination of different binders may also be applied. Suitable binders are described in for example EP 0191306 B1, EP 1170925 A1 and EP 0683374 B1.

Preferably, the binder is a polymeric material, thermosetting or thermoplastic or a mixture thereof, and the material's strain at break preferably is greater than the maximum drawing strain of the fibres as the plies are formed to yield a curved object. The following may serve as an example of such maximum drawing strain: in forming a hemisphere from flat plies, the fibres will be strained by not more than a factor of $\frac{1}{2}\pi$, corresponding with a draw ratio of approx. 1.6.

Suitable polymeric binders are for example those mentioned in WO 91/12136 A1 (pages 15-21). Vinyl esters, unsaturated polyesters and epoxy resins or phenol resins are preferably used as thermosetting polymers. Preferably, the thermoplastic binders are for example polyurethanes, vinyl polymers, polyacrylates, polyolefins or thermoplastic block copolymers such as polyisopropene-polyethylene-butene-polystyrene or polystyrene-polyisoprene block copolymers. In a special embodiment the binder consists essentially of a thermoplastic elastomer, which preferably covers the individual filaments in the fibres and has a tensile modulus (determined according to ASTM D638 at 25° C.) of less than 40 MPa. Such binder yields a ply with a high flexibility and an object with a combination of rigidity and toughness. For the forming of objects such as helmets, which must provide protection against various objects, such as the impact of bullets, use is preferably made of a binder material with higher rigidity; alternatively, there is added to the package a material that enhances the rigidity of the curved object.

A film may also be used as the binder in the fibre ply, preferably a thermoplastic material, for example a polyolefin such as polyethylene, polypropylene or copolymers thereof, polytetrafluorothylene, polyesters, polyamides or polyurethanes, including thermoplastic elastomeric versions of the aforementioned polymers and more preferably polyethylene whose melting point is preferably lower than that of the fibres, which film then melts at a temperature at which the manufacture of the object takes place and can wholly or partly cover or envelop the fibres. Suitable films have a thickness of, for example, less than 20, 15 or even less than 10 microns. Such films may also be applied as the outer plies on a stack of unidirectional fibre plies that already contain a binder, for example a matrix material.

Preferably, the amount of binder in a fibre ply is at the most 30% by mass, more preferably at the most 25, 20 or even at the most 15% by mass; this is because the fibres contribute the most to the desired mechanical or ballistic properties.

In a special embodiment the fibre ply contains fibres only, which fibres, prior to or during the process according to the invention, by a combination of temperature, pressure and time, partly melt and fuse, also known as sintering, at the surface. The fibres are kept tensioned, thus preventing the good mechanical properties from being lost or significantly diminishing as a result of molecular relaxation. Such objects with sintered fibre plies are highly transparent to radar beams and, thus, suitable for use in for example radomes, which are strongly doubly curved, too.

The package may be built up of a number of fibre plies such that the desired thickness is reached. In the process according to the invention, many different fibre configurations, as well as combinations, are in principle possible in the fibre plies. Options are various fabrics, non-wovens with randomly or unidirectionally oriented fibre plies. This is an advantage over the know process, in which forming is effected almost exclusively by planar shear, which becomes difficult when there is more than one fibre direction in the starting material. Especially when the individual plies that make up the package have more than two fibre directions it is almost impossible with the known process to achieve wrinkle-free production. In the process according to the invention there is no constraint on the number of fibre directions; indeed, many different fibre directions are advantageous in that an object with highly homogeneous properties is obtained.

For so-called ballistic objects, such as helmets, which are designed to stop projectiles, it is advantageous to use relatively thin individual fibre plies, for example unidirectional plies. In general, more thin plies give a better result than a package of fewer but thicker plies, at equal overall weight. Preferably, an individual fibre ply is thinner than 0.1 mm, more preferably thinner than 0.05 mm and even more preferably thinner than 0.03 mm.

The package of fibre plies can be a loose stack of plies that have not been attached to one another but also a sheet in which the plies are attached to one another, for instance as a result of a preceding step in which loose plies are united with the aid of, for example, adhesives, and/or by compressing the plies in a press under pressure and at elevated temperature below the melting point of the fibres. In the former case, the process according to the invention preferably also comprises a step in which the plies are pressed together under pressure and at elevated temperature below the melting point of the fibres. This step may immediately follow the imposition of a tensile stress or may wholly or partly coincide therewith. Attachment between loosely stacked fibre plies may result from the presence of a binder in the fibre plies, from the aforementioned sintering effect, or result from the presence of further plies in the package, such as an adhesive ply, for example in the form of a film as described previously.

The desired number of stacked fibre plies with the desired fibre direction is brought into the desired shape by deforming it at elevated temperature (thermal deformation). Such deformation may be effected using suitable techniques known per se such as forming with the aid of a heated die and, if desired, a complementary master mould. Here, the fibre plies are placed over an opening in a supporting surface, in particular over a mould opening, and are clamped slip-free outside the opening onto the supporting surface with the aid of a blankholder with closed border. "Slip-free clamping" here means pressing against the supporting surface with such force that, under the forces exerted on the clamped fibre plies by the imposition of tensile stress on the fibre plies to be discussed below, the fibre plies remain in position and, contrary to the known processes, are scarcely drawn into the mould, if at all. Preferably, the maximum draw-in is such that at the most 30%, preferably at the most 20% of the elongation which the fibre plies must undergo in thermal deformation results from the fibre plies slipping away from beneath the blankholder and, thus, is at least 70%, preferably 80% the result of the fibres being drawn.

Subsequently, the die having the desired shape is brought on to the fibre plies at a right angle and pushed through the opening, with the die exerting a force on the section of the plies located within the closed border essentially perpendicularly to the plane defined by the border. In this way, the fibres are subjected to a tensile stress.

Prior to being clamped with the blankholder, the fibre plies are brought to a temperature, for example in an oven, which is below the melting point of the fibre polymer; alternatively, the fibres are brought to the desired temperature after being clamped, for example by infrared heating or by hot air. Preferably, this temperature is equal to the temperature of the die and the mould, if used, to be defined below.

The die and the mould, if used, have been brought to a temperature which lies between a temperature not more than 10° C. above the melting point of the fibre polymer and a temperature not more than 20° C., preferably not more than 15° C. below this melting point. Owing to the contact of the heated die with an outer fibre ply, that ply and the further plies assume a temperature between the melting point of the fibre polymer and a temperature not more than 20° C. below this melting point.

The die may have a higher temperature than the melting point of the fibre polymer per se, because the melting point of the fibres increases when they are tensioned, which is the case when the die is forcefully pushed through the opening.

The force exerted by the die on the fibre plies results in a tensile stress in the fibres which, if large enough, induces irreversible strain or drawing of the fibres in the said temperature range. To that end, the imposed stress should preferably be between 5 and 90% of the tensile strength of the fibres. The force to be exerted therefor by the die on the package is determined by the amount of fibres in the plies and the tensile strength thereof. Preferably, the imposed stress amounts to 10 or even 20% of the fibres' tensile strength and not more than 80 or even 70% thereof. A higher stress prevents relaxation of the fibres.

The drawing process will proceed more rapidly according as the temperature is nearer to the fibre's actual melting point, which is the melting point at the imposed stress, and as the imposed fibre stress is higher. According as the drawing process proceeds more slowly, the risk of molecular relaxation in the fibres increases, which has an adverse effect on the strength and modulus of the fibres and, so, on the properties of the object to be formed. A temperature higher than the actual melting point results in loss of the good properties of the fibres and an imposed stress higher than the tensile strength of the fibres leads to fibre breakage.

In a particular embodiment of the process according to the invention the fibre plies are prevented from being drawn into the mould by winding the fibres in different directions around a strong frame to form the various plies. If the frame is not deformed, the imposed tensile stress will only cause the wound fibres to be drawn, without the use of an additional blankholder.

The above directions enable one skilled in the art to choose a suitable combination of temperature and fibre tension so as to adequately draw the fibres within a desired time period. The desired deformation and drawing will normally take place in about 1 to 40 minutes, preferably about 2 to 30 minutes, for a package containing fibres made of ultra-high molecular polyethylene, depending on temperature, tensile stress and the amount of deformation to be achieved.

If the package employed in the process according to the invention is a panel of plies attached to one another, such as a pre-pressed package, the use of a complementary die or mould is optional. The advantage of using a mould and pressurizing is a further improvement of the properties of the formed object. If the package employed is a loose stack of fibre plies, it is preferred to use a complementary mould so that in a next step, which may also partly coincide with the step of drawing fibres under the influence of tensile stress, the package is pressurized by the combination of the die and mould at an elevated temperature below the melting point of the fibres, and an object is obtained in which the fibre plies are attached or connected to one another. The pressure that is applied to the package may vary widely, for example between about 0.1 MPa and about 30 MPa, a higher pressure yielding better results.

After forming and optionally pressurizing, in order to avoid undesired relaxation processes of the fibres and achieve improved dimensioning of the object, the object is preferably cooled with the die being kept in place, preferably until the object has a temperature lower than about 80° C.

An additional advantage of the process according to the invention is that the drawing process causes the mechanical properties of the fibres to be improved still further, especially when relaxation is prevented.

A further advantage is that the process according to the invention allows a number of products to be readily made from a package simultaneously, with the aid of a multiple die and mould. In the known process the fibre plies shift extensively as the die is pushed in. If a number of products are made simultaneously from one package, deformation of the plies in the package would have a negative effect on the quality of the formed object. Thus, in the process according to the invention a number of objects can be simultaneously made from one package with higher quality and with less edge losses in material.

An object manufactured by the process according to the invention distinguishes itself from objects manufactured by the known process, wherein the drawing into the mould, shear and slip are the deformation mechanisms, by a more homogeneous structure. The object is wrinkle-free, which means that it has no or hardly any wrinkles, and the angles between fibres in two adjacent plies are less different throughout the object. In the known objects distinct differences can be seen in the said parameters as a result of non-uniform drawing in and deformation of the fibre plies in the mould from beneath the blankholder and as a result of the shear which occurs and slip vis-à-vis one another, resulting in inhomogeneity of the object's properties.

Therefore, the invention also relates to an object, curved in one or more directions, obtainable by the process according to the invention as described above.

A characteristic feature of the invention is that the fibres are strained during the forming process. The amount of strain is different for fibres in different positions of the object. During straining the fibre diameter of the decreases, because the fibre volume remains virtually the same. A characteristic of the object obtainable by the process of the invention is that the mean diameter of the fibres in the object is smaller than the mean diameter of the fibres in the starting package. The fibre diameter customarily exhibits a statistical spread. The mean diameter is here defined as the diameter common to the majority of fibres. In other words, that diameter at which the peak in a graphical representation of a statistical distribution of fibre diameters is highest (filament diameter histogram). The filament diameter distribution of fibres can be determined by for instance an optical technique in combination with image analysis, for example with an OFDA 100 automated projection microscope in accordance with the instruction of the supplier Hornik Fibertech (CH). In the case of a pressed panel of fibre plies or a formed object it is possible to prepare a plaque, a cross-section on which the fibre diameters are visible with a microscope, for example a light microscope or an electron microscope.

An object, curved in one or more directions, obtainable by the process according to the invention exhibits different mean fibre diameters in different positions, in accordance with the aforementioned definition, with the difference between the greatest and smallest measured mean value being at least 7% (corresponding to about 15% difference in elongation). The greatest measured value then is virtually equal to the initial value of the mean fibre diameter of the fibres in the fibre plies of the package. This applies especially where the object is obtained from a package of fibre plies that, prior to application of the tensile stress, contained fibres of one particular mean fibre diameter. Therefore, the invention also relates to a curved object containing fibres with such a difference in diameter. Preferably, the difference is more than 10%, more preferably more than 15% (corresponding to about 30% difference in elongation) and most preferably more than 25%.

The invention claimed is:

1. A wrinkle-free object, curved in one or more directions, comprising at least one ply containing drawn polymeric fibres, which object exhibits in different locations a different mean fibre diameter which is a diameter common to a majority of fibres, with a difference between greatest and smallest mean values of the different mean fibre diameters being at least 7%, wherein the object is made by a process comprising deforming at elevated temperature the at least one ply containing polymeric fibres, wherein the step of deforming includes imposing a tensile stress on the fibres at a temperature lying between the melting point of the fibres at the imposed tensile stress and 20° C. below the melting point, which tensile stress is high enough for the fibres to be drawn to achieve the difference between the greatest and smallest mean values of the different mean fibre diameters.

2. The object of claim 1, wherein the difference between the greatest and the smallest mean value of the mean fibre diameter is at least 10%.

3. The object of claim 1, wherein the polymeric fibres are chosen from the group consisting of polyolefin fibers, polyvinyl alcohol fibers, polyamide fibers and polyester fibers.

4. The object of claim 1, wherein the fibres have a tensile strength of at least 2 GPa and a tensile modulus of at least 50 GPa as measured according to ASTM D885M.

5. The object of claim 1, wherein the fibres are ultrahigh molecular weight polyethylene fibres.

6. The object of claim 1, further comprising multiple plies containing drawn polymeric fibres, wherein the plies are unidirectional plies containing continuous fibres which are unidirectionally aligned.

7. The object of claim 1, further comprising multiple plies containing drawn polymeric fibres, wherein the plies are unidirectional plies and the fibre direction in each ply is preferably at an angle with the fibre direction in adjacent plies.

8. The object of claim 1, wherein the at least one ply consists of polymeric fibres and up to 50% by mass of a binder.

9. The object of claim 1, wherein the at least one ply is thinner than 0.1 mm.

10. The object of claim 1, wherein the object is chosen from the group consisting of radomes, helmets, ballistic protection panels for shoulders and armour panels for automobiles or for military helicopters.

11. A wrinkle-free object comprising at least one ply which is deformed so as to provide a curve in at least one or more directions, the at least one ply containing polymeric fibres which are drawn in response to deformation of the at least one ply so that the object exhibits in different locations a different mean fibre diameter which is a diameter common to a majority of fibres, with a difference between greatest and smallest mean values of the different mean fibre diameters being at least 7%.

12. The object of claim 11, wherein the difference between the greatest and the smallest mean value of the mean fibre diameter is at least 10%.

13. The object of claim 11, wherein the polymeric fibres are chosen from the group consisting of polyolefin fibers, polyvinyl alcohol fibers, polyamide fibers and polyester fibers.

14. The object of claim 11, wherein the fibres have a tensile strength of at least 2 GPa and a tensile modulus of at least 50 GPa as measured according to ASTM D885M.

15. The object of claim 11, wherein the fibres are ultrahigh molecular weight polyethylene fibres.

16. The object of claim 11, further comprising multiple plies containing polymeric fibres, wherein the plies are unidirectional plies containing continuous fibres which are unidirectionally aligned.

17. The object of claim 11, further comprising multiple plies containing polymeric fibres, wherein the plies are unidirectional plies and the fibre direction in each ply is preferably at an angle with the fibre direction in adjacent plies.

18. The object of claim 11, wherein the at least one ply consists of polymeric fibres and up to 50% by mass of a binder.

19. The object of claim 11, wherein the at least one ply is thinner than 0.1 mm.

20. The object of claim 1, wherein the object is chosen from the group consisting of radomes, helmets, ballistic protection panels for shoulders and armour panels for automobiles or for military helicopters.

* * * * *